(12) United States Patent
Maenle

(10) Patent No.: US 9,949,421 B2
(45) Date of Patent: Apr. 24, 2018

(54) SHARK FIN WEAR BAR

(71) Applicant: Unverferth Manufacturing Company, Inc., Kalida, OH (US)

(72) Inventor: William C. Maenle, Ottoville, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 73 days.

(21) Appl. No.: 14/672,798

(22) Filed: Mar. 30, 2015

(65) Prior Publication Data
US 2015/0271984 A1 Oct. 1, 2015

Related U.S. Application Data

(60) Provisional application No. 61/973,106, filed on Mar. 31, 2014.

(51) Int. Cl.
*A01B 13/08* (2006.01)
*A01B 15/02* (2006.01)

(52) U.S. Cl.
CPC ............ *A01B 13/08* (2013.01); *A01B 15/025* (2013.01)

(58) Field of Classification Search
CPC .................................................. A01B 15/025
USPC ............................................. 172/699, 700
See application file for complete search history.

(56) References Cited

U.S. PATENT DOCUMENTS

| | | | | |
|---|---|---|---|---|
| 3,001,591 A * | 9/1961 | Johnson | ............... | A01B 15/025 172/700 |
| 3,202,222 A * | 8/1965 | Norris | ................. | A01B 15/025 172/177 |
| 3,254,727 A * | 6/1966 | Helton et al. | ............. | E02F 9/28 172/719 |
| 3,536,147 A * | 10/1970 | Norton et al. | ......... | A01B 13/08 172/719 |
| 3,704,753 A * | 12/1972 | Hasforth et al. | ...... | E02F 9/2841 172/700 |
| 4,127,073 A * | 11/1978 | Blair | .................... | A01C 23/025 111/123 |
| 4,799,823 A * | 1/1989 | Williams | ............... | E02F 9/2875 172/719 |
| 4,932,478 A * | 6/1990 | Jones | ................... | A01B 15/025 172/699 |
| 5,165,487 A * | 11/1992 | Williams et al. | ..... | E02F 9/2875 172/699 |
| 5,415,236 A * | 5/1995 | Williams | ............... | A01B 13/08 172/699 |
| 5,540,288 A * | 7/1996 | Dietrich | ................ | A01B 15/04 172/166 |
| 6,012,534 A * | 1/2000 | Kovach et al. | ........ | A01B 13/08 172/156 |
| 6,443,237 B1 * | 9/2002 | Myers et al. | ......... | A01B 15/025 172/730 |
| 8,770,311 B2 * | 7/2014 | Rivera et al. | ......... | E02F 9/2875 172/699 |

(Continued)

Primary Examiner — Thomas B Will
Assistant Examiner — Joel F. Mitchell
(74) Attorney, Agent, or Firm — Rothwell, Figg, Ernst & Manbeck, P.C.

(57) ABSTRACT

A shark fin wear bar includes a fin edge configured to till the soil. The fin edge is positioned to face in the same direction as the ripper point. The shark fin wear bar also includes a first part configured to abut the rear of the ripper point such that debris from tilling cannot get lodged between the two components.

15 Claims, 12 Drawing Sheets

(56) References Cited

U.S. PATENT DOCUMENTS

2013/0081834 A1* 4/2013 Rivera et al. ......... E02F 9/2875
  172/713

* cited by examiner $20° \leq \theta \leq 30°$ $\theta \approx 27°$

SHARK FIN WEAR BAR

CROSS-REFERENCE TO RELATED APPLICATIONS

The present application claims priority to U.S. Provisional Application No. 61/973,106, filed Mar. 31, 2014, the entire disclosure of which is incorporated herein by reference.

BACKGROUND OF THE INVENTION

Field of the Invention

The present invention relates to a system for tilling soil, and, more specifically, to a wear bar with a raised center fin configured to assist in the tilling of soil by a ripper point.

Description of the Related Art

In the agricultural industry, soil that is to be used for planting may be tilled to improve the soil. Tilling may be done by agitating the soil with a mechanical system or tool, such as rollers, harrows or hand tools. The benefits of tilling include loosening and aerating the soil, which makes it easier for the seed to be planted, and spreading the nutrients in the soil such that it is more evenly distributed within the soil to be used for planting. Other benefits of tilling include mechanical destruction of weeds, drying the soil, and exposure of soil crumble so that it may be destroyed by the environment.

SUMMARY OF THE INVENTION

An apparatus for tilling soil including a shark fin wear bar mounted on a sub-soiler shank. The shark fin wear bar includes a fin edge to facilitate the tilling of soil. The shark fin wear bar also includes a first end configured to match the profile of a ripper point such that debris tilling does not become lodged in between the wear bar and the ripper point.

According to an embodiment of the present invention, An apparatus for tilling a field includes a tillage machine mounting member including a coupling member and a ripper point coupled to the coupling member. The apparatus also includes a wear bar positioned on a portion of the mounting member above the ripper point. The wear bar includes a fin to till a soil.

According to another embodiment of the present invention, the ripper point may include a fin, and the wear bar fin includes an edge positioned to extend upwardly from the ripper point fin. The wear bar may include a first part positioned adjacent a rear of the ripper point fin. The first part of the wear bar may abut the rear of the ripper point fin.

According to another embodiment of the present invention, the wear bar may include a second end positioned to abut the tillage machine mounting member. A width of the tillage machine mounting member may be less than a width of the wear bar.

According to another embodiment of the present invention, the tillage mounting member may be a sub-soiler shank. The tillage mounting member may include a slot to receive the wear bar fin. The tillage mounting member may include a mounting bar and the wear bar may include a rear slot to engage the mounting bar.

DETAILED DESCRIPTION OF THE PRESENT INVENTION

While the present invention may be embodied in many different forms, a number of illustrative embodiments are described herein with the understanding that the present disclosure is to be considered as providing examples and not intended to limit the invention to the preferred embodiments described and/or illustrated herein.

In an embodiment of the present invention, the shark fin wear bar includes a fin edge configured to till the soil. The fin edge is positioned to face in the same direction as the ripper point. The shark fin wear bar also includes a first part configured to abut the rear of the ripper point such that debris from tilling cannot get lodged between the two components.

Figure 1:
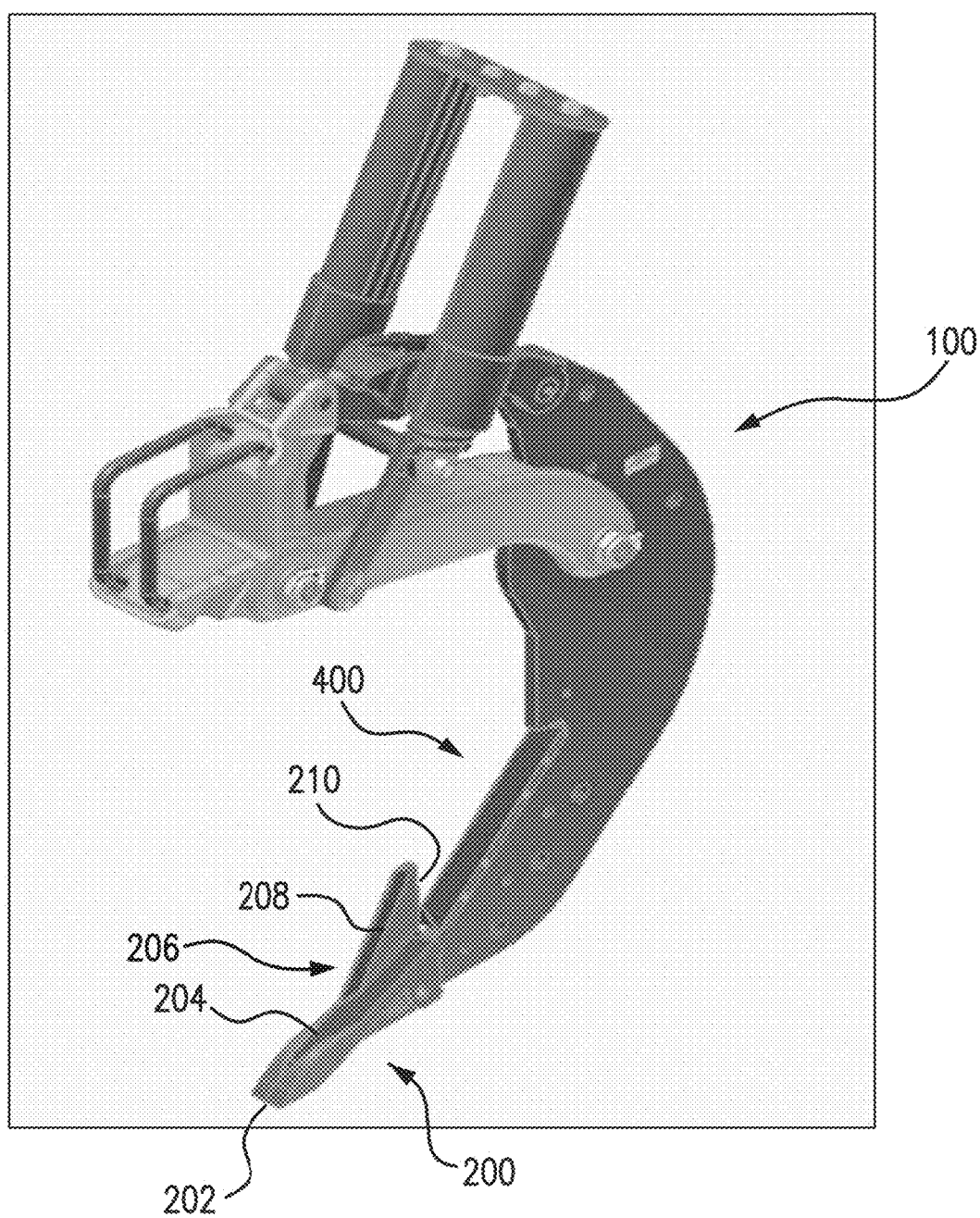
FIG. 1 illustrates a perspective view of ripper points with a fin and wear bar without a fin mounted on a sub-soiler shank according to another embodiment of the present invention.

FIG. 1 illustrates an example of a sub-soiler shank 100 with a known ripper point 200, and a wear bar 400 without a fin. The ripper point 200 and wear bar 400 are mounted on a mounting member for the sub-soiler shank 100. As shown in greater detail in FIGS. 5 and 6, the ripper point 200 may include a ripper end 202, a nose 204 and a fin 206. The fin 206 includes a fin edge 208 and a rear 210. As can be seen in FIG. 1, there is a large gap between the rear of the fin 210 and the wear bar 400. Residue and debris caused by the tilling, such as rocks and pieces of roots, can get stuck in this gap. A buildup of residue and debris in the gap will cause a loss of machine efficiency because of added friction and the operator will be forced to frequently stop tilling to remove the lodged material.

Figure 2:
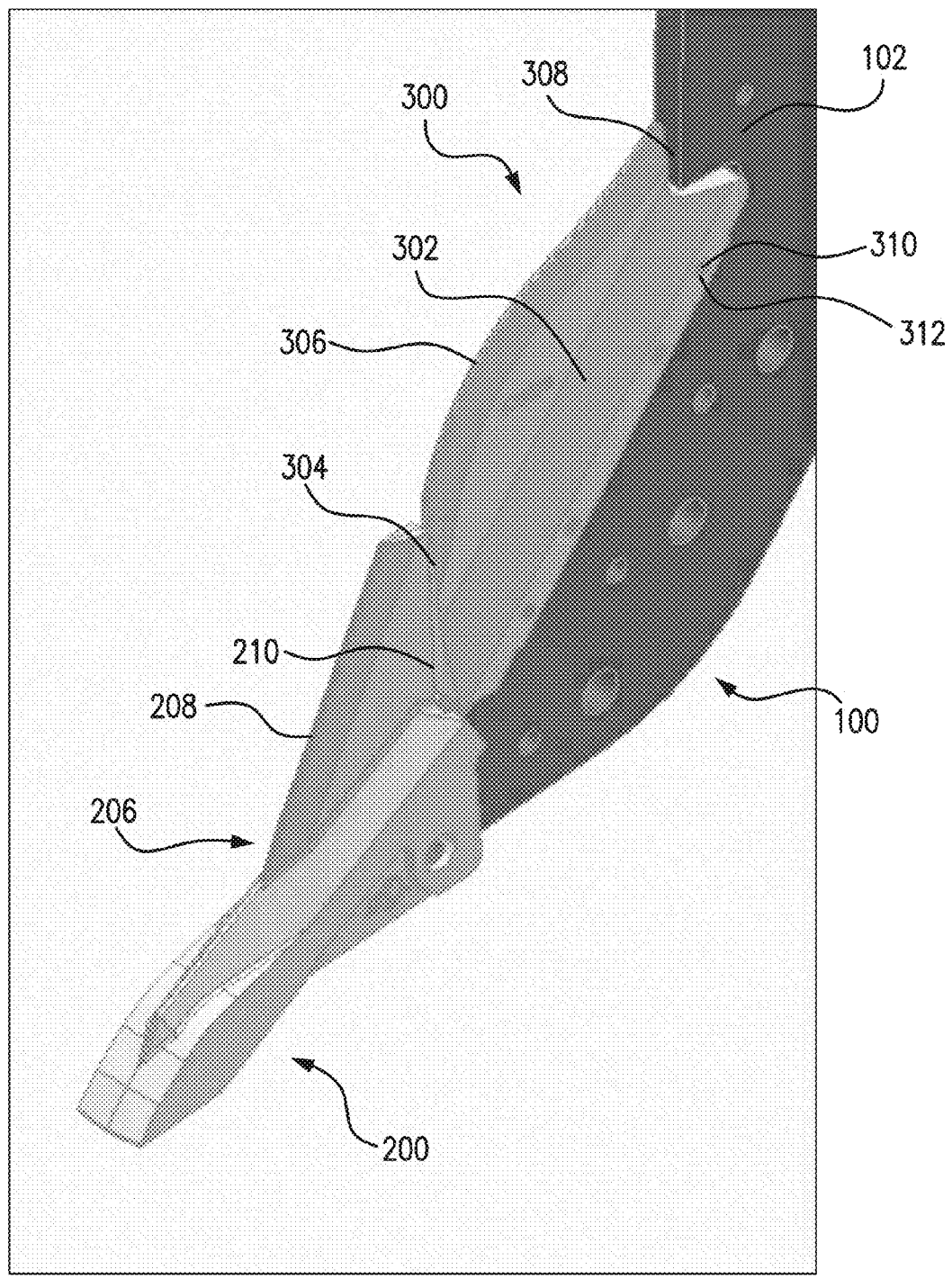
FIG. 2 illustrates a perspective view of a shark fin wear bar and a ripper point with a fin mounted on a sub-soiler shank according to an embodiment of the present invention.

FIG. 2 illustrates a perspective view of a sub-soiler shank including a wear bar with a raised center fin and a ripper point according to an embodiment of the present invention. The sub-soiler shank 100 includes a ripper point 200 and a wear bar 300. The ripper point 200 is positioned at an end of the sub-soiler shank 100 and is configured to engage the soil during tilling. The ripper point fin 206 extends upwardly towards the sub-soiler shank 100 and wear bar 200.

Figure 3:
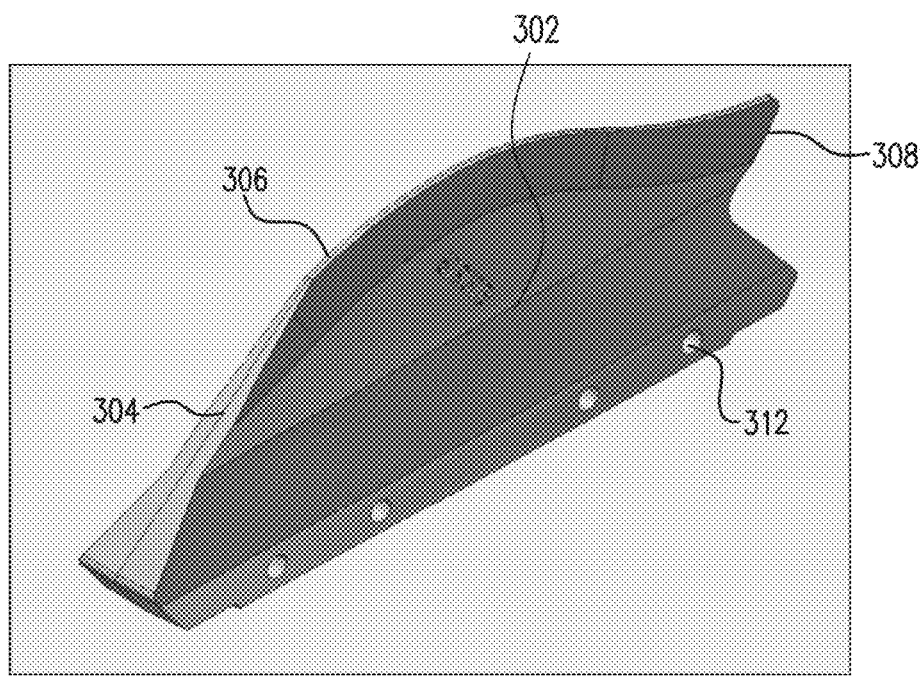
FIG. 3 illustrates a perspective view of a shark fin wear bar according to an embodiment of the present invention.
Figure 13A:
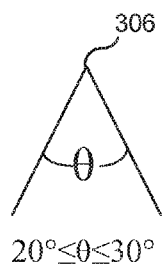
FIGS. 13A and 13B illustrates schematic views of a fin edge according to an embodiment of the present invention.
Figure 13B:
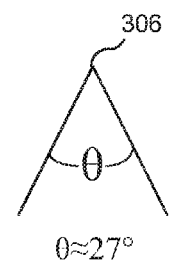

FIG. 2 shows a shark fin wear bar 302 mounted to a sub-soiler shank 100 according to an embodiment of the present invention. The shark fin wear bar 302 protrudes from the sub-soiler shank 100 such that it matches the profile of the rear 210 of the ripper point fin 206. As can be seen in FIG. 3, the shark fin wear bar 302 includes a first part 304 configured to match the profile of the rear 210 of the ripper point fin 206. The first part 304 is preferably as close as possible to the rear 210 of the ripper point fin 206 to prevent residue and debris from becoming lodged in between the ripper point and wear bar. In an embodiment of the present invention, the first part 304 of the wear bar fin abuts the rear 210 of the ripper point fin 206. The shark fin wear bar 302 includes a fin edge 306 which extends upwardly from the first part of the wear bar fin 304 and is designed to continue the upward projection of the ripper point edge 208. As shown in FIG. 2, there is a small gap between the ripper point fin edge 208 and the wear bar fin edge 306. In another embodiment of the present invention, the wear bar fin edge 306 may abut the ripper point fin edge 208. The wear bar fin edge 306 terminates at a second end 308 of the ripper point edge 208 configured to abut the sub-soiler shank 100. The edges of the fin edge 306 form an angle between 20 and 30 degrees (e.g., as shown in FIG. 13A). Preferably, the edges of the fin edge 306 form an angle of approximately 27 degrees (e.g., as shown in FIG. 13B). When the shark fin wear bar 302 is cast, the edge of the fin edge 306 does not come to a point, i.e., the edge is slightly blunt. After the casting process, the fin edge 306 may be machined to sharpen it and bring the edge to a point.

Figure 7:
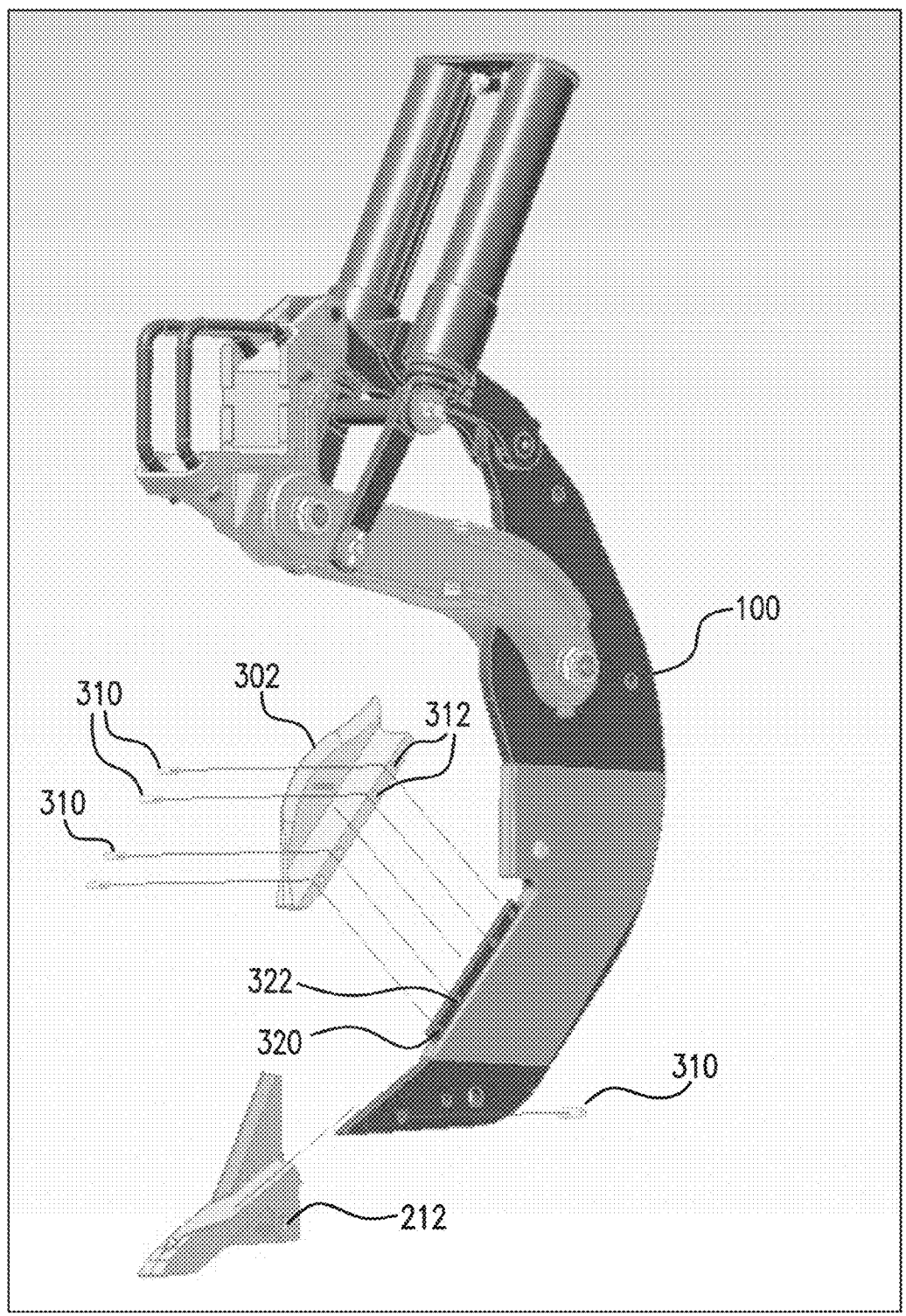
FIG. 7 illustrates an exploded view of a sub-soiler shank with a shark fin wear bar and ripper point according to an embodiment of the present invention.

The shark fin wear bar 302 may be mounted to the sub-soiler shank 100 or the wear bar 200 via coupling members 310 engaging openings 312 in the shark fin wear bar fin 302. The coupling members 310 may be spiral pins, bolts or any other known coupling member known in the art. FIG. 7 illustrates an exploded view of a sub-soiler shank 100 and a shark fin wear bar 302. The shark fin wear bar 302 is mounted to a shank bar 320 on the sub-soiler shank 100 which has a plurality of openings 322. The coupling members 310 engage the openings 312 in the shark fin wear bar 302 and the openings 322 in the bar simultaneously to couple the shark fin wear bar 302 to the sub-soiler shank 100. In another embodiment of the present invention, the shark fin wear bar 302 may be configured to be placed over a traditional wear bar, such as wear bar 400 shown in FIG. 1.

FIG. 3 illustrates a perspective view of a shark fin wear bar according to an embodiment of the present invention. As shown in FIG. 3, shark fin wear bar 302 includes wear bar fin 304, fin edge 306, ripper point 308, and openings 312. In embodiments, shark fin bar 302 can be made of any type of material, such as a metal, a hybrid of metals and plastics, or a plastic material. As shown in FIG. 3, wear bar fin 304 is shaped so that it is at a greater width at the bottom edge of 304 than at the top edge of 304 which connects to fin edge 306. In embodiments, the front face of wear bar fin 304 can be a trapezoid shape, a triangular shape, or an irregular shape (e.g., a combination of two or shapes, such as rectangular, triangles, and/or other shapes). In embodiments, wear bar fin 304's surface is perpendicular to the sides of shark fin wear bar 302.

As shown in FIG. 3, fin edge 306 extends from the top edge of wear bar fin 304 to the top edge of ripper point edge 308. In embodiments, fin edge 306 can be shaped as a curved edge as shown in FIG. 3. In alternate embodiments, fin edge 306 can be shaped with linear edges. In further embodiments, fin edge 306 can be shaped with a combination of curved and linear portions.

In embodiments, ripper point edge 308 is a curved or non-curved edge, whereby an angle is formed by two curved portions meeting at the center of ripper point edge 308. In embodiments, openings 312 are in parallel to the sides of shark fin wear bar 302 and extend through to both sides of the shark fin wear bar 302.

As such, the shape of shark fin wear bar 302 provides for a combination of an increased vertical angle and a narrow front edge which causes soil to flow laterally by the shank as the shank passes through soil, dirt, or other material. This prevents the dirt from lifting and causing excessive soil disturbance. Thus the combination of shark fin wear bar 304 and a shark fin point, as further described in FIG. 5, results in total lateral fracturing of the soil. This prevents the dirt from being lifted and creating a disturbance at the surface of the shark fin wear bar and the ripper point as shown in FIG. 2. Accordingly, the improved soil finish is helped by the use of a narrow profile shank used with this particular point and wear bar combination.

Figure 4:
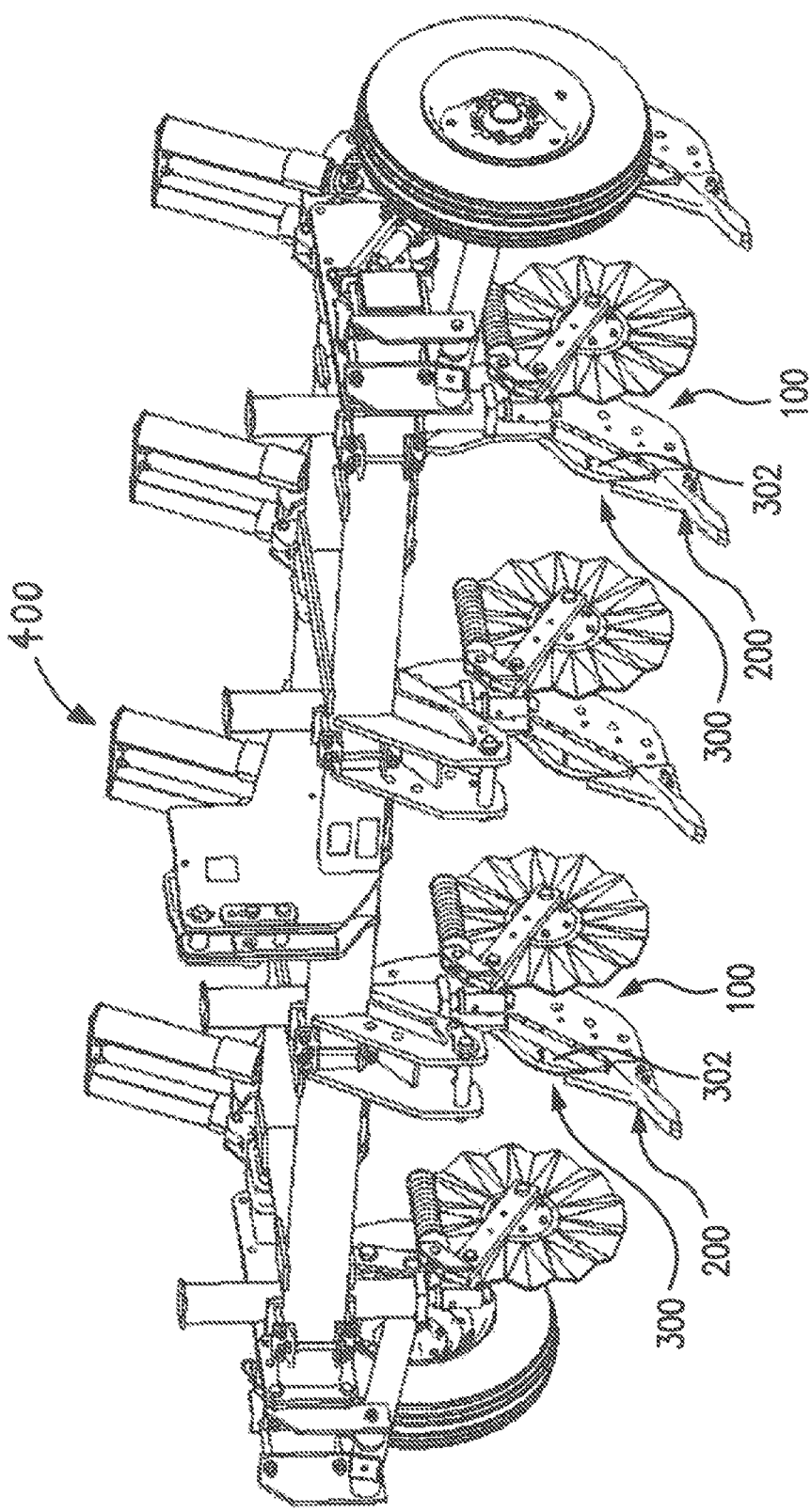
FIG. 4 illustrates a ripper point with a fin and a shark fin wear bar mounted on a sub-soiler shank according to an embodiment of the present invention.

FIG. 4 illustrates a ripper point with a fin and a shark fin wear bar mounted on a sub-soiler shank according to an embodiment of the present invention. As shown in FIG. 4, sub-soiler shank 100 is attached to machine 400. In embodiments, machine 400 can be any type of equipment used for tilling soil. As shown in FIG. 4, sub-soiler shank 100 includes ripper point 200, wear bar 300, and shark fin wear bar 302. In embodiments, a machine 400 with the shark fin wear bar 302 and shark fin points to outperform a machine 400 without the shark fin wear bar 302 and ripper point 200. This is because the shark fin wear bar 302 eliminates the buildup of soil residue and field debris behind the shark fin points. Accordingly, the shark fin wear bar 302 and shark fin points allow machine 400 to work with greater efficiencies at higher working speeds and, as such, reduce field time required to complete a particular tillage task.

Figure 5:
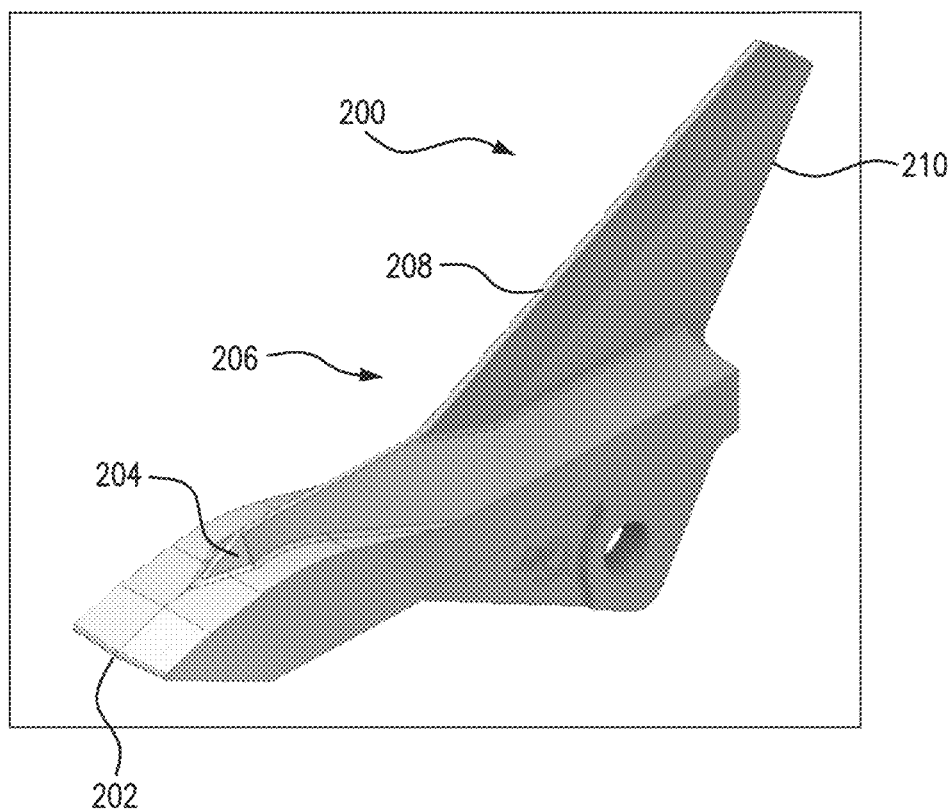
FIGS. 5 and 6 illustrate a perspective view of a ripper point with a fin according to another embodiment of the present invention.
Figure 6:
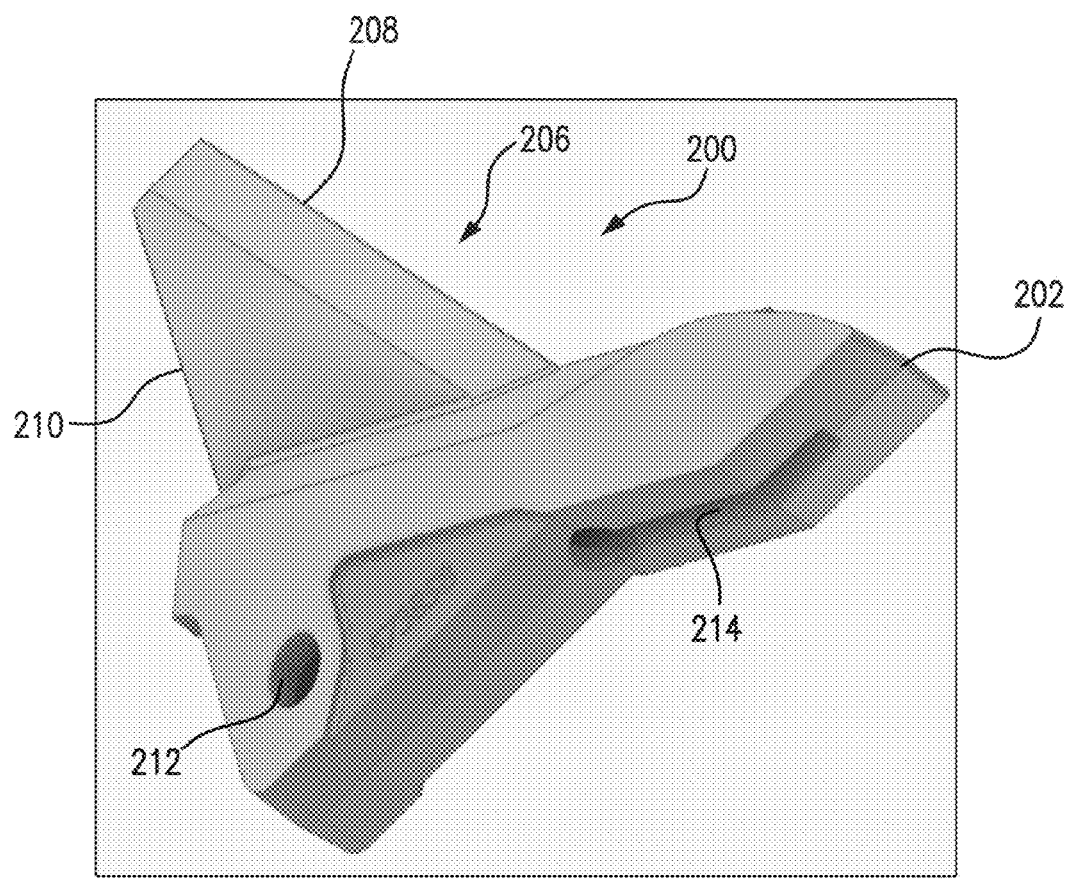

FIGS. 5 and 6 illustrate a perspective view of a ripper point 200 with a fin 206 according to another embodiment of the present invention. As described in co-owned and U.S. Provisional Application No. 61/945,480, filed on Feb. 27, 2014, the entire disclosure of which is incorporated herein by reference, the upright fin 206 serves as a divider to split the soil in front of the shank and wear bar, thus giving additional lateral fracturing as the shank moves through the soil. The lateral movement of the soil around the upright fin 206 causes additional vertical fracturing of the soil.

Figure 13C:
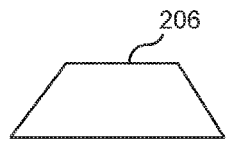
FIG. 13C illustrates a schematic view of a ripper point fin according to an embodiment of the present invention.

FIG. 5 illustrates a perspective view of a ripper point with a fin according to another embodiment of the present invention. As shown in FIG. 5, ripper point 200 includes edge 202, section 204, ripper point fin 206, ripper point edge 308, and rear 210. In embodiments, edge 202 is shaped with a straight edge. In alternate embodiments, edge 202 is a combination of two sides that connect at an angle at a center of edge 202. In further embodiments, edge 202 is curved in shape. In embodiments, section 204 is located on the top part of ripper point 200 and traverses from the front of ripper point 200 to edge 208. In embodiments, ripper point fin 206 is trapezoid shaped with straight edges (e.g., as shown in FIG. 13C). In alternate embodiments, ripper point fin 205 may be shaped by a hybrid of straight edges and curved edges. As such, rear 210 can be straight, curved, or a mixture of straight and curved lengths.

FIG. 6 illustrates another perspective view of a ripper point with a fin according to embodiments of the present invention. As shown in FIG. 6, ripper point 200 is shown from a view that shows connector hole 212 and slot 214. In embodiments, connector hole 212 allow for ripper point 200 to connect to sub-soiler shank 100. In embodiments, bolts, screws, and/or any other type of connector can be used to connect ripper point 200 to sub-soiler shank 100. In embodiments, slot 214 is used to attach ripper point 200 to sub-soiler shank 100.

FIG. 7 illustrates an exploded view of a sub-soiler shank with a shark fin wear bar and ripper point according to an embodiment of the present invention. As shown in FIG. 7, ripper point 200 and shark fin wear bar 302 are connected to sub-soiler shank 100. In embodiments connectors 310 are used in holes 312 to connect shark fin wear bar to sub-soiler shank 100. As shown in FIG. 7, connectors 310 then pass through holes 312 and connect to openings 322 on mounting member 320. Additionally, or alternatively, as shown in FIG. 7, ripper point 200 can be connected to sub-soiler shank 100 by using connector 310 through connector hole 212 or any other hole in ripper point 200. In embodiments, connector 310 can be any type of device or combination of devices that can connect devices to sub-soiler shank 100.

Figures 8A, 8B:
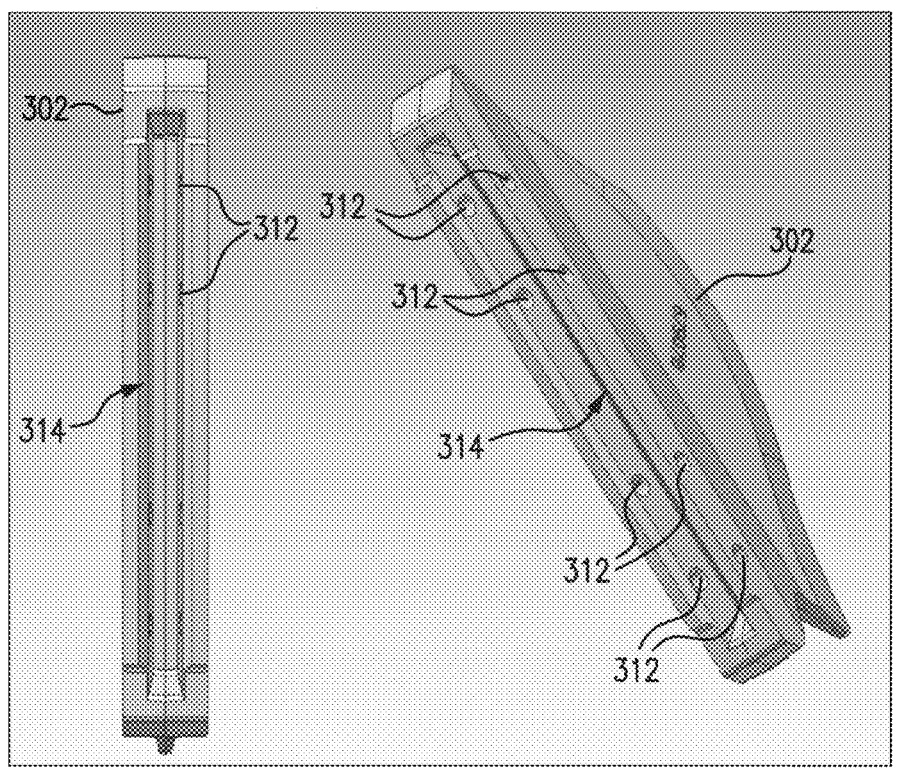
FIGS. 8a-b illustrate views of a rear of the shark fin wear bar according to an embodiment of the present invention.

FIGS. 8a-b illustrate the rear of the shark fin wear bar 302 which engages the sub-soiler shank 100. The rear of the shark fin wear bar 302 includes a slot 314 configured to match a shank bar 320 profile as shown in FIG. 7. The openings of the shark fin wear bar 312 extend through the slot 320 to both sides of the shark fin wear bar 302.

The shark fin wear bar 302, shown in FIG. 8b, has a fin edge 306, as previously described in FIG. 3, which is designed to vertically fracture the soil as the shank travels through the ground. The increased vertical fracturing is accomplished because of the increased vertical angle and narrow front edge of the wear bar fin 306. The soil that is being tilled will flow laterally by the shank because of the shark fin wear bar 302 design, and this prevents the soil from lifting and causing excessive soil disturbance at the surface. The shark fin wear bar 302 may be used with the ripper point fin 206, and this combination will create total lateral fracturing of the soil, which prevents the dirt from being lifted and excessive disturbances being created at the surface. The lateral fracturing of the soil by the shark fin wear bar 302 improves the finish of the soil in the tilled field and allows for a faster speed of operation, which increases machine efficiency.

The shark fin wear bar 302 may be manufactured as part of the wear bar 300. In another embodiment, the shark fin wear bar 302 may be manufactured as a separate component and mounted on the wear bar, such as with bolts 310 configured to engage openings in the fin 312 and the wear bar 300. The shark fin wear bar 302 may be manufactured by casting. The shark fin wear bar 302 may be composed of any material that has enough wear resistance and strength to last in adverse soil conditions. For example, the shark fin wear bar 302 may be made of steel, hardened steel, steel alloy, ductile iron, heat treated ductile iron, steeling forgings, heat treated steel forgings, cast steel, heat treated cast steel and some plastics.

Figure 9:
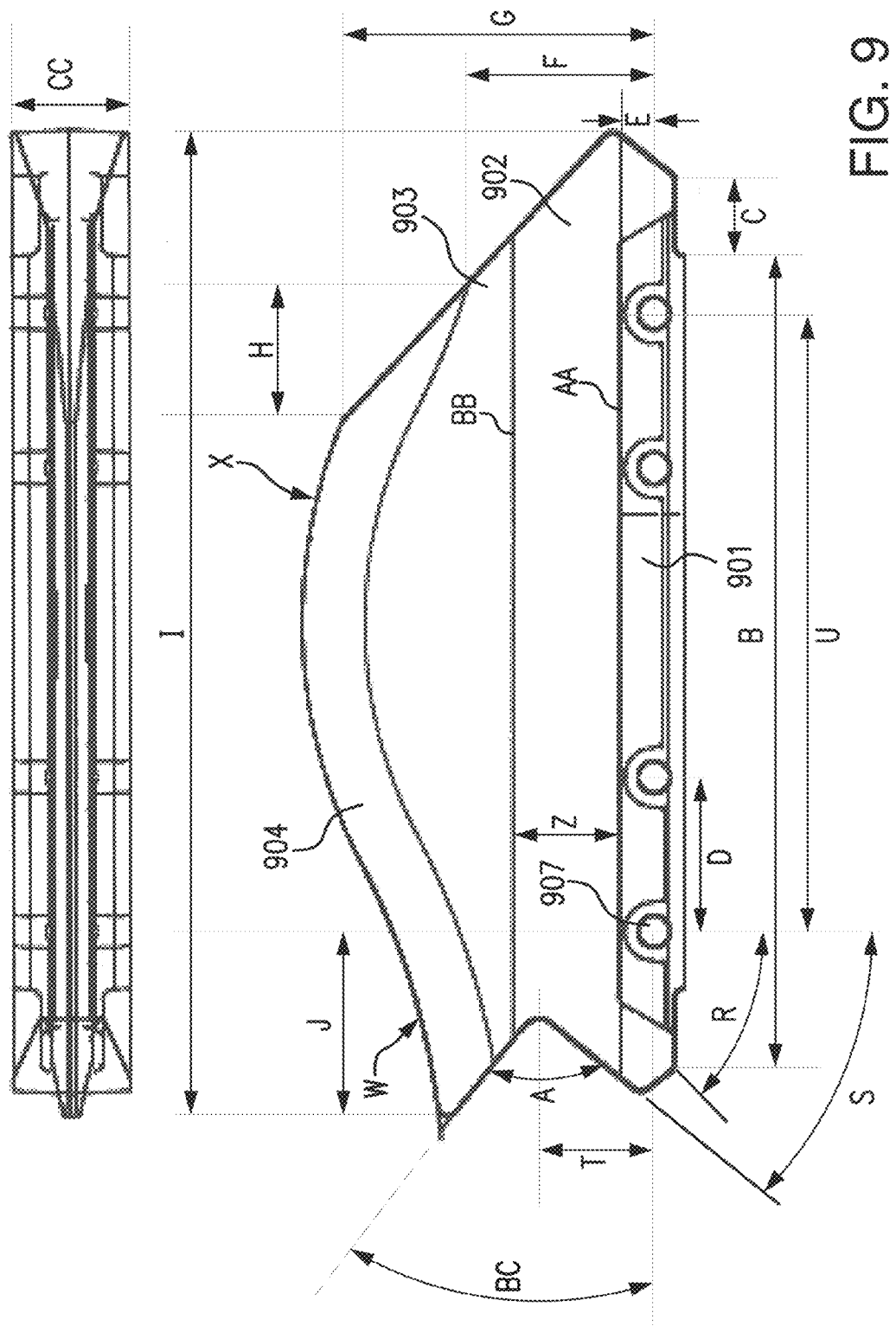
FIGS. 9-12 illustrates schematic views of a shark fin wear bar according to an embodiment of the present invention.

FIG. 9 illustrates example views of shark fin wear bar 302 from a top perspective view and a side perspective view. The side perspective view shows portions 901, 902, 903, and 904. In embodiments, portions 901, 902, 903, and 904 may be cast out of a single mold or one or more of these portions may be separate parts that are then connected to each other (e.g., soldering) to create shark fin wear bar 302. As shown in FIG. 9, the bottom side of portion 901 has a bottom length that is the combination of length "B" and length "C." The length "B" can be any suitable value, such as within a range of 8 inches to 9.5 inches, e.g., about 8.5 inches. The length "C" can be any suitable value, such as within a range of 1 inch to 2.5 inches, e.g., about 1.75 inches. Portion 901 has an upper length that has a length of "AA." Length "B" is the distance from the back end of portion 901 to a point on portion 901 that is not beveled or chamfered. Length "C" is the length of the beveled/chamfered portion of the bottom side of portion 901. As shown in FIG. 9, portion 901 has a number of holes 907. Each hole 907 may be a distance of dimension "D" from another hole 907. Each hole may be a ⅜ type hole or any other type of hole. The length "D" can be any suitable value, such as within a range of 1 inch to 2.2 inches, e.g., about 1.9375 inches. The distance from the back hole 907 to the front hole 907 is of a length "U." The length "U" can be any suitable value, such as within a range of 7.5 inches to 7.8 inches, e.g., about 7.75 inches. Portion 901 has a height of "E." The length "E" can be any suitable value, such as within a range of 0.4 inches to 0.7 inch, e.g., about 0.53135 inches. Furthermore, the back edge of portion 901 is angled such that the one part of the back edge creates an angle "S" with the center of back hole 907; and another part of the back edge has an angle "R" with the center of back hole 907. The angle "R" can be any suitable value, such as within a range of 25 degrees to 40 degrees, e.g., about 30 degrees. The angle "S" can be any suitable value, such as within a range of 35 degrees to 49 degrees, e.g., about 39 degrees.

As shown in FIG. 9, portion 902 has a height of "Z" and its bottom length is a dimension "AA" and has an upper length of a dimension "BB." Also as shown in FIG. 9, portion 903 has a bottom length of dimension "BB," and a curved shape for the upper length. In embodiments, the curved shape of portion 903 may be the same shape as the top curved length of portion 904. In embodiments, a height of dimension "F" extends from the center of hole 907 to the front edge of portion 903 which meets the bottom front edge of portion 904. The height "F" can be any suitable value, such as within a range of 2.3 inches to 3.25 inches, e.g., about 2.34 inches.

As shown in FIG. 9, the side of shark fin wear bar 302 has length of "I." The length "I" can be any suitable value, such as within a range of 11 inches to 13 inches, e.g., about 12.375 inches. Portion 904 has a top front edge which is at a distance "H" from the bottom front edge of portion 904. The length "H" can be any suitable value, such as within a range of 1.2 inches to 1.5 inches, e.g., about 1.34 inches. The back edge of portion 904 is at a distance "J" from the center of back hole 907. The length "J" can be any suitable value, such as within a range of 2 inches to 3 inches, e.g. about 2.5 inches. The top front edge of portion 904 is located at a height "G" from the center of hole 907. The height "G" can be any suitable value, such as within a range of 3.5 inches to 4.25 inches, e.g., about 3.94 inches.

In embodiments, the top curvature of portion 904 can be a combination of different curves. In embodiments, portion 904 may be combination of a curve "W" and a curve "X." The curve "W" can be any suitable value, such as within a range of R 8¾ to R 9½, e.g., about R 9¼. The curve X" can be any suitable value, such as within a range of R 6 to R 7, e.g., about 6½.

In embodiments, the combination of portions 901, 902, 903, and 904 result in a back edge that has an angle "A" which has a center that is at a height "T" from the bottom part of the back edge of portion 901. The angle "A" can be any suitable value, such as within a range of 80 degrees to 100 degrees, e.g., about 90 degrees. The height "T" can be any suitable value, such as within a range of 1.25 inches to 1.75 inches, e.g., about 1.47 inches. Also, the combination of portions 901, 902, 903, and 904 result in an angle "BC" that is the angle created between the back top edge of portion 904 and the top part of the back edge of portion 901. The angle "BC" can be any suitable value, such as within a range of 30 degrees to 45 degrees, e.g. about 39 degrees.

FIG. 9 also illustrates the top view of shark fin wear bar 302, which has a width of dimension "CC" and a length of dimension "I." The width "CC" can be any suitable length, such as within a range of 1.25 inches to 1.75 inches, e.g., about 1.5 inches.

Figure 10:
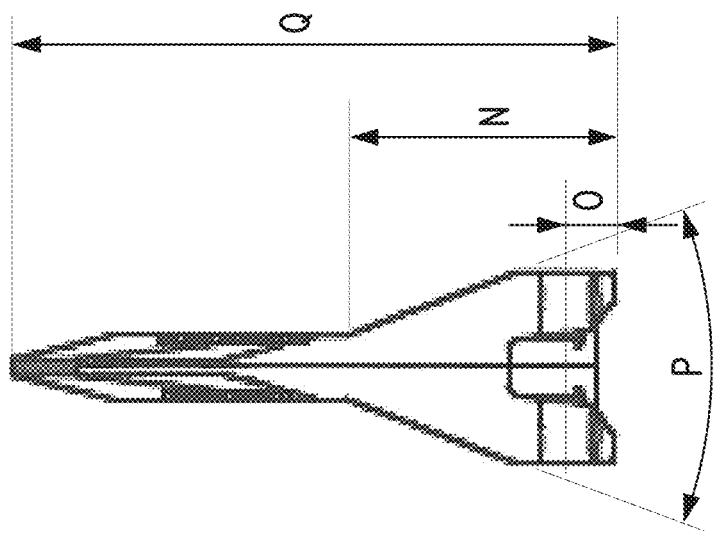

FIG. 10 illustrates a front face of shark fin wear bar 302, e.g., wear bar fin 304 as shown in FIG. 3. As shown in FIG. 10, the front face has a height of "Q," a length of "N," a length of "O," and an angle of "P." The height "Q" can be any suitable value, such as within a range of 4.5 inches 5.25 inches, e.g., about 4.84 inches. The length "N" can be any suitable value, such as within a range of 3 inches to 3.25 inches, e.g., about 3.1875 inches. The length "O" is the height from the center of hole 907 to the bottom length of portion 901. The length "O" can be any suitable value, such as within a range of 0.3 inches to 0.5 inches, e.g., about 0.40 inches. The angle "P" can be any suitable value, such as within a range of 35 degrees to 45 degrees, e.g., about 40 degrees.

Figure 11:
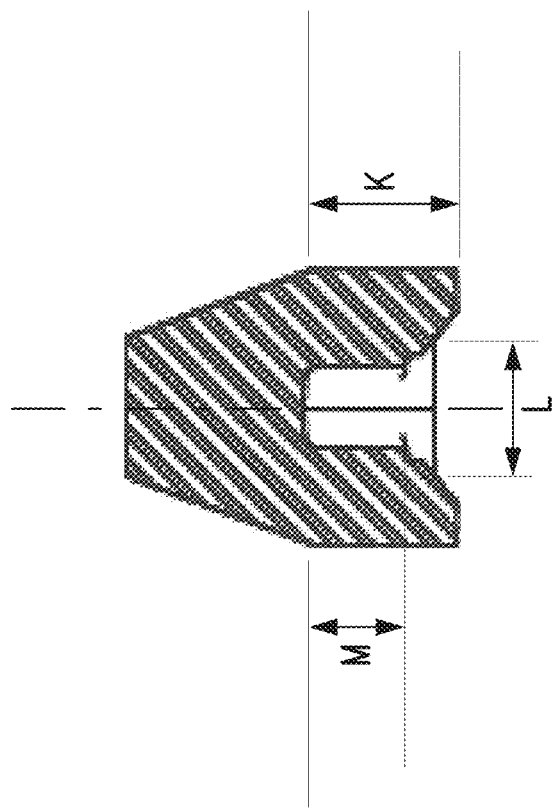

FIG. 11 illustrates a cut out section of shark fin wear bar 302. The cut-out section shows the interior of the shark fin wear bar 302 so as to show the slot that runs through the device. As shown in FIG. 11, the cut-out section has a dimension "L" which is the width of the slot; a dimension "K" which is the height of the top of the slot to the bottom length of portion 901; and a dimension "M" which is the height of the slot. The width "L" can be any suitable value, such as within a range of 0.25 inches to 0.5 inches, e.g., about 0.4375 inches. The height "K" can be any suitable value, such as within a range of 0.75 inches to 1 inch, e.g., about 0.875 inches. The height "M" can be any suitable value, such as within a range of 0.4 inches to 0.6 inches, e.g., about 0.5625 inches.

Figure 12:
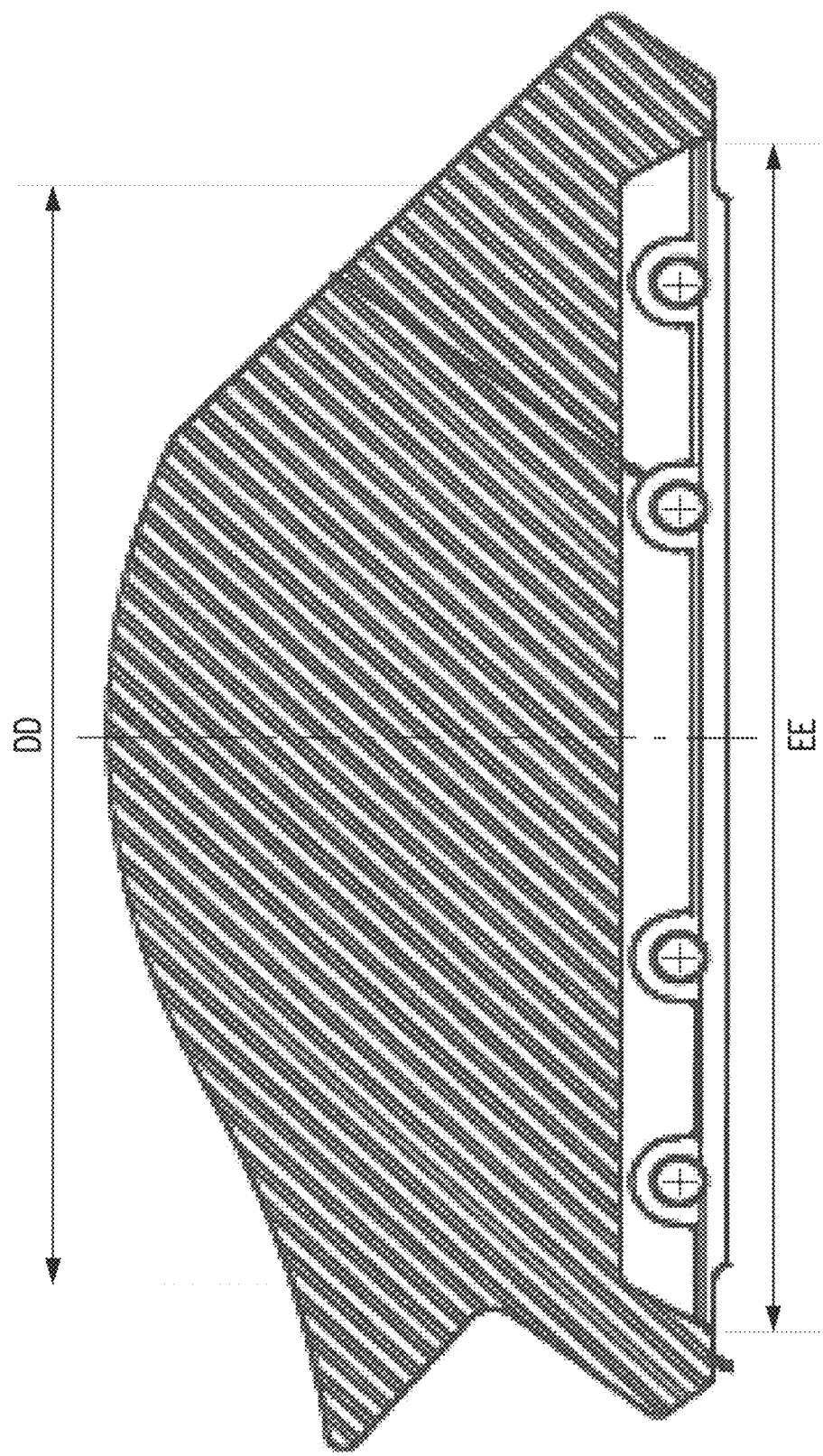

FIG. 12 illustrates a side view of the slot that runs across the lower part of shark fin wear bar 302. The slot, also shown as portion 906, has an upper length of "DD" and a lower length of "EE." The height of the slot is described in FIG. 11. The length "DD" can be any suitable value, such as within a range of 9 inches to 10 inches, e.g., about 9.5 inches. The length "EE" can be any suitable value, such as within a range of 10 inches to 10.5 inches, e.g., about 10.3125 inches.

In embodiments, any value selected for one or more of the dimensions in FIGS. 9-12 is selected such that each selected value's relationship to each other selected dimensional value provides for the shapes as shown in FIGS. 9-12.

From the above it will be appreciated that the wear bar fin of the present invention includes a fin edge to assist in the vertical fracturing of the soil during tilling and a first edge to fill in the gap behind the ripper point fin. It will also be appreciated that various changes can be made to the system without deviating from the spirit and scope of the appended claims. For example, the sub-soiler shank may be made narrower to increase the efficiency of the machine.

I claim:

1. An apparatus for tilling a field, comprising:
   a tillage machine mounting member including a coupling member;
   a ripper point coupled to the coupling member; and
   a shark fin wear bar positioned on a portion of mounting member above the ripper point, wherein the shark fin wear bar includes a fin to till a soil,
   wherein the ripper point includes a fin and the shark fin wear bar fin includes an edge positioned to extend upwardly from the ripper point fin, and
   wherein the edge of the shark fin wear bar fin is a curved edge, whereby an angle is formed by two curved portions meeting at the center of the curved edge,
   wherein said angle is between 20 degrees and 30 degrees.

2. The apparatus of claim 1, wherein the shark fin wear bar includes a first part positioned adjacent a rear of the ripper point fin.

3. The apparatus of claim 2, wherein the first part of the shark fin wear bar abuts the rear of the ripper point fin.

4. The apparatus of claim 1, wherein the shark fin wear bar includes a second end positioned to abut the tillage machine mounting member.

5. The apparatus of claim 1, wherein a width of the tillage machine mounting member is less than a width of the shark fin wear bar.

6. The apparatus of claim 1, wherein the tillage mounting member is a sub-soiler shank.

7. The apparatus of claim 1, wherein the tillage mounting member includes a slot to receive the shark fin wear bar.

8. The apparatus of claim 1, wherein the tillage mounting member includes a mounting bar.

9. The apparatus of claim 3, wherein the shark fin wear bar includes a rear slot to engage the mounting bar.

10. An apparatus for tilling a field, comprising:
    a tillage machine mounting member including a coupling member;
    a ripper point coupled to the coupling member; and
    a shark fin wear bar positioned on a portion of mounting member above the ripper point, wherein the shark fin wear bar includes a fin to till a soil,
    wherein the ripper point includes a fin and the shark fin wear bar fin includes an edge positioned to extend upwardly from the ripper point fin, and
    wherein the edge of the shark fin wear bar fin is a curved edge, whereby an angle is formed by two curved portions meeting at the center of the curved edge,
    wherein said angle is approximately 27 degrees.

11. A tillage machine including a sub-soiler shank to till a soil, the shank comprising:
    a mounting member having a lower end and an edge extending upward from the lower end;
    a ripper point coupled to the mounting member at the bottom end and extending from the mounting member to a ripper end designed to make initial contact with the soil, said ripper point further including a ripper fin extending upwardly to an upward portion of the shank, wherein said ripper fin makes a non-zero angle with said ripper end; and
    a shark fin wear bar having a bottom, a forward edge extending from said bottom into a fin edge extending upwardly from said forward edge and terminating at a top end, said bottom coupled to the mounting member at the mounting member edge, said forward edge coupled to a rear of said ripper fin, and said top end coupled to said shank;
    wherein said fin edge of said shark fin wear bar continues an upward projection of said ripper fin, and
    wherein said fin edge of said shark fin wear bar is a curved edge having a maximum height relative to said bottom of said shark fin wear bar at a center of said fin edge and wherein a height at the top end and a height at a point where said fin edge extends from said forward edge, relative to said bottom of said shark fin wear bar, are lower than said maximum height,
    whereby an angle is formed by two curved portions meeting at the center of the curved edge,
    wherein said angle is between 20 degrees and 30 degrees.

12. The tillage machine of claim 11, wherein the ripper point fin is trapezoid shaped.

13. The tillage machine of claim 11, wherein a length of said shark fin wear bat is greater than a height of said shark fin wear bar.

14. The tillage machine of claim 11, wherein the ripper point fin includes straight edges.

15. The tillage machine of claim 11, wherein the ripper point fin includes a hybrid of straight edges and curved edges.

* * * * *